Sept. 29, 1931. B. C. ROOT 1,824,838
CONDUIT JOINT AND METHOD OF MAKING THE SAME
Filed May 12, 1926

Inventor
Bertwell C. Root
by Wright Brown Dunlap May
attys

Patented Sept. 29, 1931

1,824,838

UNITED STATES PATENT OFFICE

BERTWELL C. ROOT, OF BERLIN, NEW HAMPSHIRE, ASSIGNOR TO BROWN COMPANY, OF BERLIN, NEW HAMPSHIRE, A CORPORATION OF MAINE

CONDUIT JOINT AND METHOD OF MAKING THE SAME

Application filed May 12, 1926. Serial No. 108,673.

This invention has relation to conduit joints and method of making the same. More specifically, the method of this invention hereinafter described is applicable to fibrous conduits, so-called, treated with waterproofing material, and among other uses extensively employed for encasing and protecting electric cables and for conducting fluids.

Fibrous conduits or tubes may be made by winding a web of cellulose pulp (either mechanical, chemical, or mixed pulp), formed on a Fourdrinier wire or other web-forming mechanism, on a mandrel, until a conduit having a wall of the desired thickness has been built up, whereupon the tube is removed from the mandrel and is dried to the desired degree. A conduit thus made is composed of a plurality of layers or convolutions, all sufficiently matted or interlocked to constitute in effect a substantially homogeneous wall. The dry conduit is then treated with a waterproofing material, e. g., pitch, which not only renders the conduit water-resistant and electro-insulating, but also strengthens and rigidifies the same, so that it is capable of withstanding substantial pressure.

It frequently occurs that it is desirable to join conduit material thus produced with like material, as, for example, in joining conduit sections end to end or in securing a collar externally thereto, as described in my application, Serial No. 108,672 filed May 12, 1926, or in making the connections described in my Patents 1,755,989, 1,727,413, and 1,755,899.

This invention provides a method of joining such conduit material economically and very efficiently. This is accomplished by pegging together the material. The pegged material may then be treated with a waterproofing agent, which not only serves to saturate it, but also to bond it securely together to yield a tight, waterproof joint.

The method of this invention has various applications. Thus, conduits as made do not exceed a definite length, depending upon the width of web which may practically be formed with paper-forming machinery, and upon the length of conduit which may efficiently and practically be handled in the drying and waterproofing treatment. Consequently, only conduits up to a definite length were heretofore available, although it may be desirable for certain purposes to have available conduits of greater length at the job. Furthermore, a certain amount of spoilage takes place in manufacture, as by warpage in drying, or by deformation or breakage in handling or waterproofing. Heretofore, conduits which were spoilt prior to waterproofing were reground into pulp and mixed together with the stock for forming the web; whereas conduits spoilt during or after waterproofing were unreclaimed.

This invention provides a method of joining short conduit sections which may be cut from spoilt full length sections, either treated or untreated with waterproofing material. The method may also be employed for building up any desired length of conduit, utilizing full length sections or sections of any other length. Furthermore, bent conduit sections made, for example, as described in Letters Patent No. 1,602,579, granted to Charles Ives on October 12, 1926, may be joined into bends of considerable length, or into a coil.

By the method of this invention, the end portions of a full length conduit or conduit section are found to lap with one another, and the lapping portions are then pegged together. The sections thus united (whether or not previously treated with waterproofing material) may then be treated with waterproofing material, e. g., pitch, in the customary manner, resulting in a secure joint between the sections, which in effect constitutes a structure which is as durable and strong as an integral conduit.

For a more complete understanding of this invention, reference may be had to the following more complete description, to be considered together with certain embodiments of joints illustrated in the accompanying drawings, wherein Figure 1 illustrates in perspective a pair of conduit sections joined in accordance with the method herein described.

Figure 1:
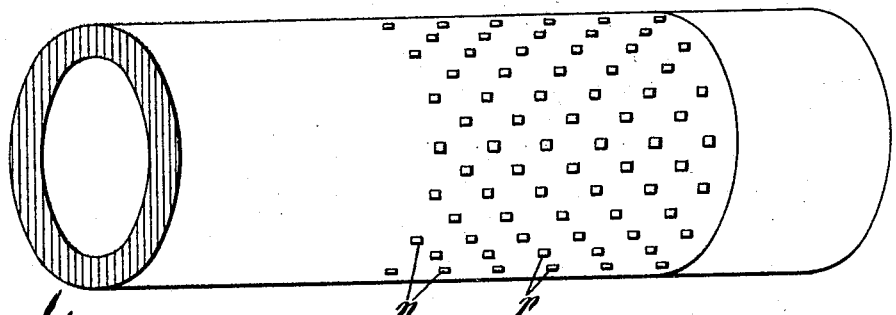

Referring to the drawings, at 1 is indicated a conduit section cut from a saturated or unsaturated conduit which it is desired to join with a similar section 2. The section 1 is scarfed at its end portion, being tapered externally as shown at 3. Likewise, the section 2 is machined to form a complementary, tapering end portion 4. The mating sections are then assembled in lapping relation, as shown, whereupon the sections are fastened together.

The fastening means herein employed are wooden pegs 5, similar to those employed in pegging shoes, and may be arranged in spaced rows r about the lapping portions. The sections are thus securely fastened together and are not liable to work loose from one another. To facilitate pegging, apertures of less length than the pegs may be made initially in the sections, and the pegs may then be inserted into the apertures and driven into the unperforated material, and, if desired, a shoe-pegging machine, which both forms the hole and drives the peg into the material, may be used. The sections thus fastened together are then treated with waterproofing material, e. g., pitch, in a manner to effect the saturation of the fibrous structure and the bonding together of the sections. However, where the conduit sections are previously saturated, the second waterproofing treatment may be only sufficient to produce an intimate bond or union between the mating portions and a tight waterproof joint.

Figure 2:
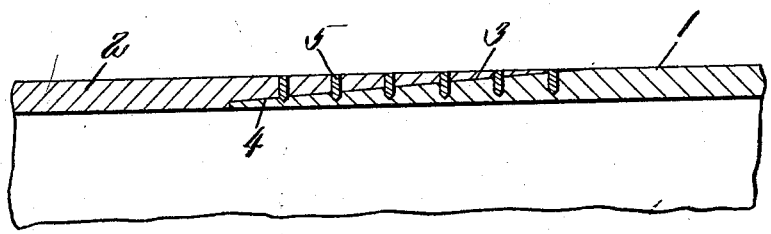
Figure 2 represents a partial section through a row of pegs of the joint of Figure 1.
Figure 3:
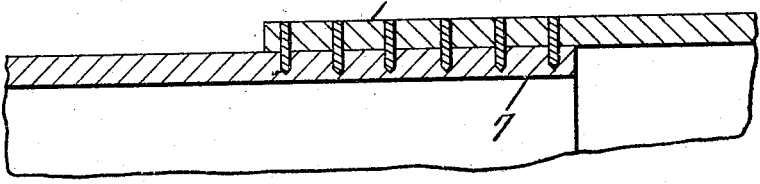
Figure 3 illustrates another embodiment of joints.
Figure 4:
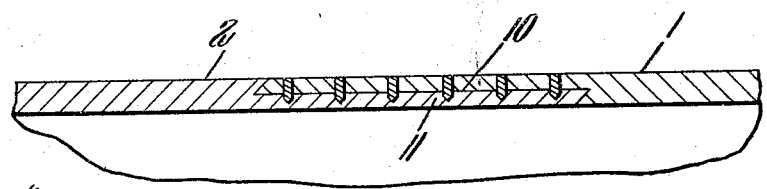
Figure 4 illustrates a further embodiment.

Figure 2 illustrates a joint formed between conduit sections of different diameters, the external diameter of one being equal to the internal diameter of the other. In such case, the end portion 6 of the larger conduit section overlaps the end portion 7 of the smaller conduit section. The sections are pegged together at their overlapping portions.

If desired, in place of tapering the end portions of the sections as shown in Figure 1, the wall of the conduit section 1 may be formed with an internally-stepped end 10, and the mating section 2 may be formed with a complementary, internally-stepped end 11. The overlapping ends may then be pegged together as shown.

Figure 5:
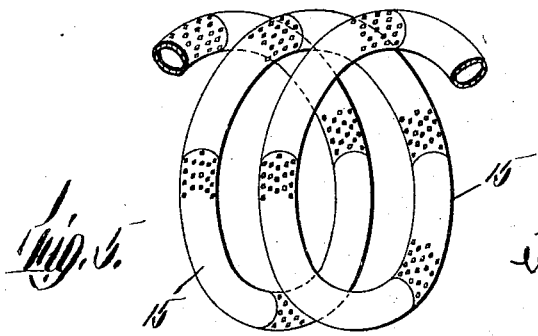
Figure 5 represents a coil built up from individual bends joined by the present method.

In Figure 5, a plurality of bent sections 15 are shown as assembled together in the form of a coil. The bent sections may be formed as in the application for patent hereinbefore referred to, after which the ends may be machined to mate with one another and the mating portions will then be pegged together. The successive sections together with their curvature are arranged to be continuous or in the same sense, each section, however, being tilted slightly out of the plane of the preceding section to form a helix.

Pegged fibrous conduit joints as herein made eliminate the necessity of cumbersome couplings, which are ordinarily employed for joining conduits, and, because of the economical method of making such joints, short conduit sections which may be cut from conduits spoiled in manufacture, may be salvaged and built up into suitable lengths which are strong and durable.

Having thus described certain embodiments of this invention, it should be obvious that it is susceptible of various changes and modifications without departing from its spirit or scope as defined by the appended claims.

What I claim is:

1. A joint between two sections of rigid felted fibrous conduit, comprising scarfed end portions of said sections fitted together in overlapping relationship, wooden pegs extending across the contacting faces of said end portions and embedded partly in each said portion, and waterproofing compound permeating said sections and penetrating said pegs.

2. A joint between two sections of rigid felted fibrous conduit, comprising end portions of said sections fitted together in overlapping relationship, wooden pegs extending across the contacting faces of said end portions and embedded partly in each said portion, and waterproofing compound permeating said sections and penetrating said pegs.

In testimony whereof I have affixed my signature.

BERTWELL C. ROOT.